(12) United States Patent
Le Quere

(10) Patent No.: US 7,448,654 B2
(45) Date of Patent: Nov. 11, 2008

(54) FLUID TRANSPORT CIRCUIT ELEMENT

(75) Inventor: Philippe Le Quere, Betton (FR)

(73) Assignee: Legris SA, Rennes (FR)

( * ) Notice: Subject to any disclaimer, the term of this patent is extended or adjusted under 35 U.S.C. 154(b) by 35 days.

(21) Appl. No.: 11/115,273

(22) Filed: Apr. 27, 2005

(65) Prior Publication Data
US 2005/0242572 A1 Nov. 3, 2005

(30) Foreign Application Priority Data
Apr. 27, 2004 (FR) .................................. 04 04436

(51) Int. Cl.
*F16L 37/00* (2006.01)
(52) U.S. Cl. ..................... 285/319; 285/308; 285/340; 285/314
(58) Field of Classification Search ................. 285/319, 285/322, 308, 340, 377, 314
See application file for complete search history.

(56) References Cited

U.S. PATENT DOCUMENTS

| 3,447,819 | A | | 6/1969 | Borsum et al. |
| 3,731,955 | A | | 5/1973 | Borsum et al. |
| 4,610,468 | A | * | 9/1986 | Wood .......................... 285/308 |
| 5,505,501 | A | * | 4/1996 | Seabra ........................ 285/322 |
| 5,975,591 | A | * | 11/1999 | Guest .......................... 285/319 |
| 6,312,019 | B1 | * | 11/2001 | Nakazumi et al. ........... 285/308 |
| 6,869,109 | B2 | * | 3/2005 | Matsushita .................. 285/322 |
| 7,063,359 | B2 | * | 6/2006 | Vallee ......................... 285/319 |

* cited by examiner

*Primary Examiner*—David E Bochna
(74) *Attorney, Agent, or Firm*—Young & Thompson

(57) ABSTRACT

A fluid transport circuit element comprising a body having a bore with one end fitted with a pipe end coupling device, the coupling device having a portion fitted with an anchor washer for anchoring the device in the bore, the washer being deformable between an anchor state and a free passage state, and wherein the portion fitted with an anchor washer is drivable from outside the body in the insertion direction into the bore from an anchor position in which the washer is in its anchor state and a release position in which the washer co-operates with an abutment that is stationary relative to the bore in the insertion direction, thereby bringing the washer into its free passage state in which it is retained by a retainer.

10 Claims, 3 Drawing Sheets

FLUID TRANSPORT CIRCUIT ELEMENT

The present invention relates to a fluid transport circuit element, such as a fluid emitter or receiver element, e.g. a pump or a tank, and fitted with a coupling device for coupling to the end of a pipe.

BACKGROUND OF THE INVENTION

Coupling devices are known that comprise a tubular insert for inserting in a bore and for being retained therein by an anchor washer, the tubular insert being provided on the inside with a sealing element and with a retaining member for holding a pipe end in leaktight manner inside the insert. The insert receives a tubular disconnection pusher suitable for sliding axially between a first position or rest position in which the pusher is inactive, and a second position in which the pusher is active and co-operates with the retaining washer in order to release the pipe end.

The anchor washer possesses an inner circumference that is engaged on the insert and an outer circumference that is subdivided into teeth that are inclined relative to the direction along which the insert is inserted into the bore, and arranged to bite into the surface of the bore, so that an extraction force applied to the insert from outside the bore causes the teeth to be braced and oppose withdrawal of the insert. Mounting the coupling device to the circuit element thus mainly involves pushing the insert into the bore. That kind of mounting is simple and fast.

Once mounted in that way, coupling devices cannot be separated. If there is an error in assembling such a coupling device, then the circuit element needs to be rejected because the coupling cannot be taken apart in order to correct the error.

Coupling devices are also known that can be taken apart, in which the insert is arranged to as to be screwed into the bore. Screwing such a coupling device into place takes longer than pushing in a coupling device of the above-described type, and it requires the body to be tapped.

OBJECT OF THE INVENTION

It would therefore be advantageous to have a coupling device that is suitable for being pushed into the bore of the circuit element, while nevertheless being capable of being separated therefrom, should that be necessary.

BRIEF SUMMARY OF THE INVENTION

To this end, the invention provides a fluid transport circuit element comprising a body having a bore with one end fitted with a pipe end coupling device, the coupling device having a portion fitted with an anchor washer for anchoring the device in the bore, the washer being deformable between an anchor state and a free passage state, and said portion being arranged to be drivable from outside the body in the insertion direction into the bore from an anchor position in which the washer is in its anchor state and a release position in which the washer co-operates with an abutment that is stationary relative to the bore in the insertion direction, thereby bringing the washer into its free passage state, the anchor washer being plastically deformable between its two states.

Thus, when the anchor washer support portion is brought into its release position, the anchor washer takes up its free passage state allowing the coupling device to be withdrawn from the bore. The washer is maintained in its free passage position because it deforms plastically. The washer is thus maintained in this position in particularly simple manner.

The invention also provides a fluid transport circuit element comprising a body having a bore with one end fitted with a pipe end coupling device, the coupling device having a portion fitted with an anchor washer for anchoring the device in the bore, the washer being deformable between an anchor state and a free passage state, and said portion being arranged to be drivable from outside the body in the insertion direction into the bore from an anchor position in which the washer is in its anchor state and a release position in which the washer co-operates with an abutment that is stationary relative to the bore in the insertion direction, thereby bringing the washer into its free passage state in which it is retained by retention means.

Thus, when the anchor washer support portion is brought into its release position, the anchor washer moves into its free passage state, thereby allowing the coupling device to be withdrawn from the bore.

Preferably, the anchor washer is elastically deformable between its two states, the retention means comprising a ring mounted on the anchor washer support portion downstream from the anchor washer relative to the insertion direction so as to slide onto the support portion and so as to bear against a shoulder of the bore in such a manner that the ring comes to overlie the anchor washer when the support portion is in the release position.

It is then possible to cause the ring to slide on the insert towards its initial position in order to enable the anchor washer to return into its anchor state. The coupling device is then usable again.

BRIEF DESCRIPTION OF THE DRAWINGS

Other characteristics and advantages of the invention appear on reading the following description of particular, non-limiting embodiments of the invention.

Reference is made to the accompanying drawings, in which.

DETAILED DESCRIPTION OF THE INVENTION

Figure 1:
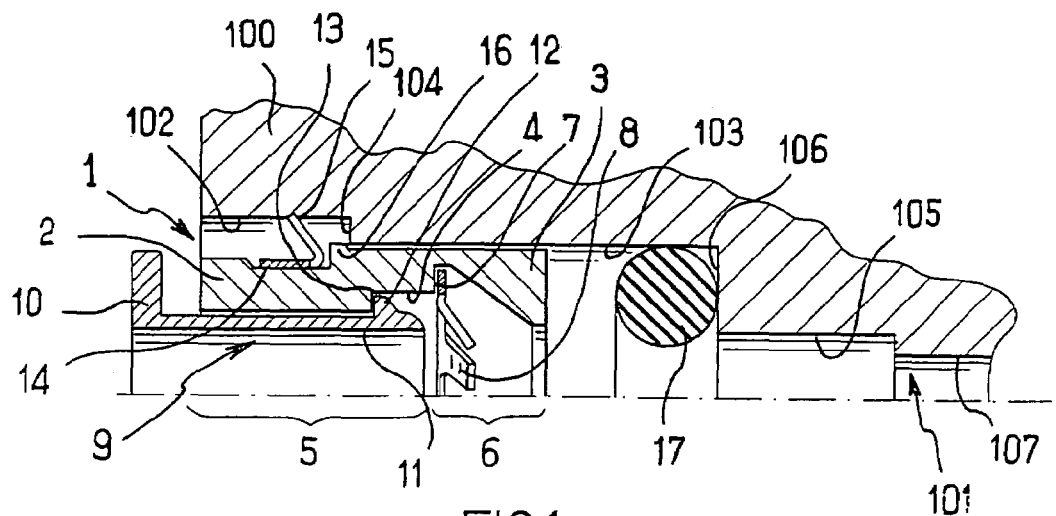
FIG. 1 is a longitudinal section view of a circuit element in a first embodiment of the invention.
Figure 2:
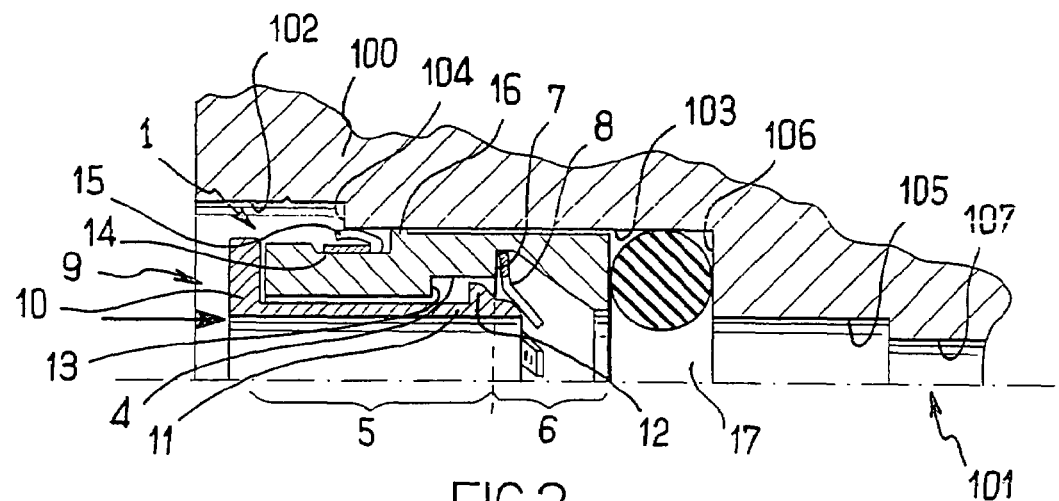
FIG. 2 is a view analogous to FIG. 1, shown during a stage of preparation for withdrawal of the coupling device from the circuit element.
Figure 3:
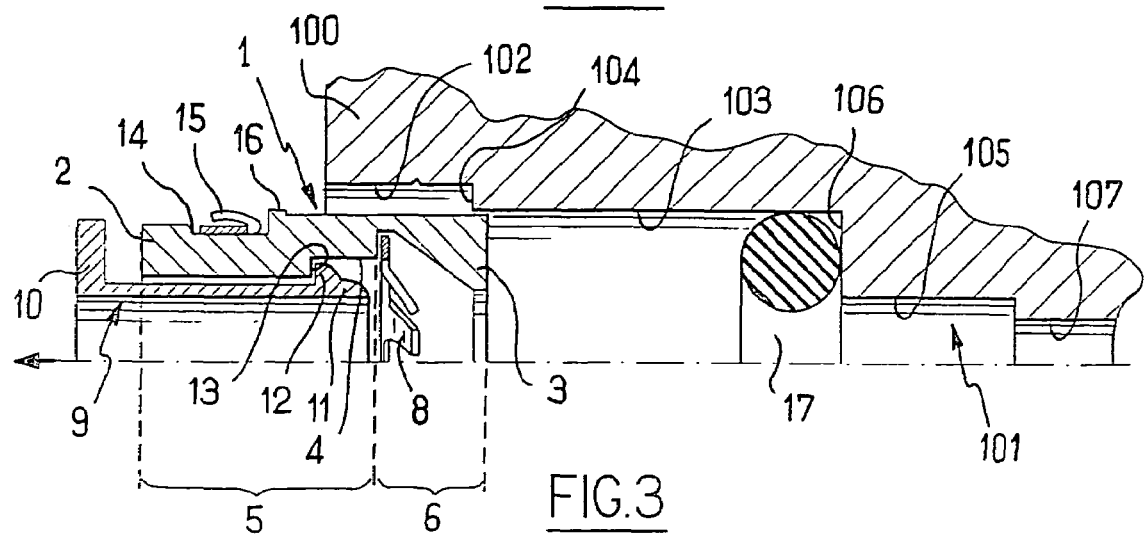
FIG. 3 is a view analogous to FIG. 1 during withdrawal of the coupling device.

With reference to FIGS. 1 to 3, the fluid transport circuit element in accordance with the invention comprises a body 100 having a bore formed therein given overall reference 101 and possessing an inlet segment 102 opening out at one end to the outside of the body 100 and at its opposite end to a segment 103 of smaller diameter than the inlet segment 102, and connected thereto via a shoulder 104. The segment 103 opens out into a segment 105 of diameter smaller than that of the segment 103 and equal to the outside diameter of the end of a pipe. The segment 105 is connected to the segment 103 by a shoulder 106 and its opposite end opens out into a segment 107 of diameter equal to the inside diameter of the end of the pipe.

The circuit element includes a coupling device enabling an end of a pipe to be connected in the bore 101.

The coupling element comprises a tubular insert given overall reference 1, having ends 2 and 3 with a bore 4 extending between them. In conventional manner, the bore 4 comprises an inlet segment 5 beside the end 2, and an outside segment 6 beside the end 3. The inlet segment 5 is of cylindrical shape and the outlet segment 6 is of frustoconical shape, flaring towards the inlet segment 5. The outlet segment has a major section of diameter greater than that of the inlet section, and it is connected thereto via a shoulder 7.

A retaining washer 8 is mounted in the outlet segment 6.

The retaining washer 8 is itself conventional, being of frustoconical shape with an outer circumference received in the major section of the outlet segment 6 in the vicinity of the shoulder 7. The retaining washer 8 has an inner circumference subdivided in conventional manner into teeth for biting into the outside surface of the end of a pipe. The retaining washer 8 is deformable between a rest state or retaining state in which it defines an inner diameter that is smaller than the outside diameter of the pipe end, and a release state in which it defines an inner diameter greater than the outside diameter of the pipe end.

A tubular pusher given overall reference 9 is received in the inlet segment 5. The pusher 9 serves to disconnect the pipe end.

The pusher 9 has an end 10 for projecting from the bore 101, and an opposite end 11 that is received in the insert 1.

The end 11 of the pusher 9 is provided on the outside with a step 12 that co-operates with a step 13 in the insert 1 to retain the pusher 9 in the insert 1. Beside the outlet segment 6, the step 12 has a sloping face enabling the pusher to be inserted into the insert.

The pusher 9 is slidably movable inside the insert 1 between a first or rest position in which the nose of the pusher 9 is spaced apart from the retaining washer 8 in its retaining state, and a second or pushed-in position in which the nose of the pusher 9 is pressed strongly against the retaining washer 8 so as to deform it is into its release state.

On the outside, the insert 1 is provided with a groove 14 in which it receives the inner circumference of an anchor washer 15 whose outer circumference is subdivided into teeth for biting into the surface of the bore 101.

The anchor washer 15 is of conventional frustoconical shape and it is plastically deformable between an anchor state in which the teeth define an outside diameter greater than the diameter of the inlet segment 102 of the bore 101, and a free passage state in which the teeth define an outside diameter smaller than the diameter of the inlet segment 102.

Downstream from the washer 15 relative to the direction in which the coupling device is pushed into the bore 101, the insert 1 has an external projection of annular shape forming an abutment 16 for coming into contact with the shoulder 104.

A sealing element 17 is received in the intermediate segment 103 in the vicinity of the shoulder 106. The sealing element 17 is annular in shape and presents an inner diameter slightly smaller than the outside diameter of the pipe end and an outer diameter that is slightly greater than the diameter of the intermediate segment 103.

The coupling device is put into place in the bore 101 in the manner described below with reference to FIG. 1.

The coupling device is inserted into the bore 101 via the end 3 of the insert 1, with the operator exerting insertion force on the pusher 9. The insertion force continues to be applied until the abutment 16 comes into contact with the shoulder 104. The insert 1 is then in the anchor position (FIG. 1).

Because of its shape, the anchor washer 15 allows the insert to be inserted, but it opposes any withdrawal thereof, its teeth bracing against and penetrating into the surface of the bore 101.

A pipe end is connected and disconnected in conventional manner, the anchor washer 15 being in its anchor state when the pusher 9 is in its first position or its second position.

Withdrawal of the connection device from the bore 101 is described below with reference to FIGS. 2 and 3.

Prior to withdrawal proper, the pusher 9 is subjected to a strong force pushing it in, e.g. by striking it with a mallet (see FIG. 2).

When pushed in this manner, the rim at the end 10 of the pusher 9 comes into abutment against the end 2 of the insert 1 and pushes it in to the bore 101. The abutment 16 is of small height. It may be continuous or segmented, e.g. in the form of breakable segments so as to make it possible to push the insert 1 further in. The abutments may also be plastically deformable so as to be capable of passing in the deformed state into the intermediate segment 103 without too much friction. As this movement is continued, the anchor washer 15 comes into abutment against the shoulder 104, thereby deforming the anchor washer 15 into its free passage state. The insert 1 is then in its release position (FIG. 2). It should be observed that, when the insert 1 is in its anchor position, the space between the end 3 and the sealing element 17 must be large enough to enable the insert to be pushed into its release position.

The coupling device can then be extracted from the bore by pulling on the pusher 9, thereby entraining the insert 1, with the anchor washer 15 retaining its free passage state because of its own plasticity (FIG. 3). In this case, the means for keeping the anchor washer in its free passage state are thus constituted by the shape of the anchor washer and by the internal structure of the anchor washer material giving it the ability to deform plastically.

Elements that are identical or analogous to those described above are given identical numerical references in the description below of variants and of a second embodiment.

Figure 4:
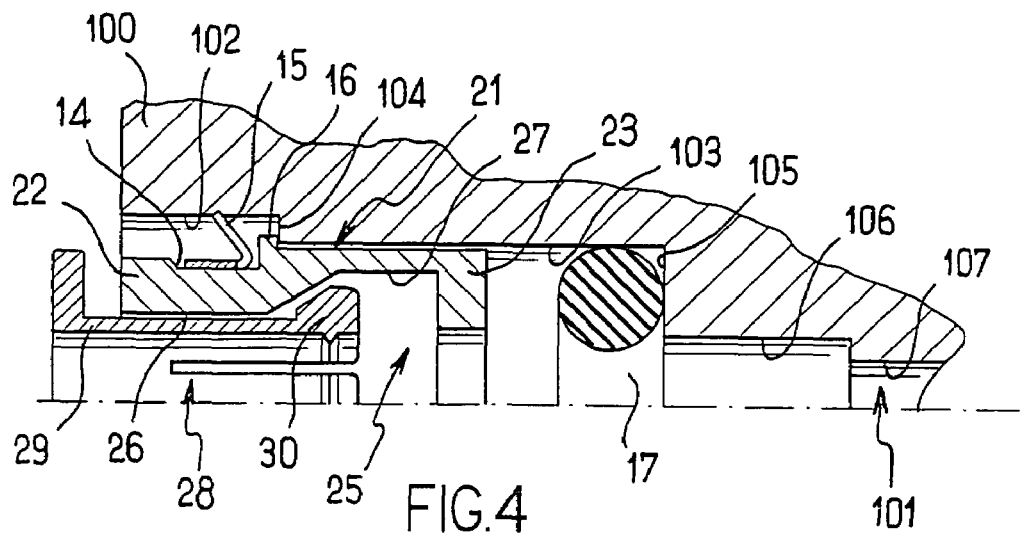
FIGS. 4 to 6 are longitudinal section views of coupling devices constituting three variants of the first embodiment.

In a first variant as shown in FIG. 4, the coupling device comprises an insert 21 of outside shape identical to that of the above-described insert 1, i.e. having an end 22 and an end 23 and a groove 14 formed in its outside surface to receive an anchor washer 15 with an abutment 16 located downstream therefrom relative to the insertion direction.

Between the ends 22 and 23 there extends a bore 25 having an inlet segment 26 of cylindrical shape and an outlet segment 27 that is connected to the inlet segment 26 via a frustoconical portion that flares away from the inlet segment 26.

In this first variant, the pusher 9 and the anchor washer 8 are replaced by a clamp given overall reference 28 and of conventional type.

The clamp 28 has an end 29 projecting from the end 22 of the insert 21, a central portion extending inside the inlet segment 26 of the bore 25, and an end 30 extending inside the outlet segment 27 of the bore 25. The end 30 is of frustoconical shape designed to co-operate with the frustoconical portion of the outlet segment 27 so that an extraction force exerted on the clamp 28 causes the through section defined by the end 30 to be reduced elastically. Such an extraction force may be the result, for example, of moving a pipe end backwards, and it causes the end of the pipe to be gripped by the clamp 28.

As in the first embodiment, an O-ring 17 is placed in the intermediate segment 103 in the vicinity of the shoulder 106. As in the first embodiment, the distance between the end 23 of the insert 21 and the sealing element 17 must be sufficient to allow the insert 21 to be pushed in as far as a release position inside the intermediate segment 103.

The coupling device is put into place, operates, and can be withdrawn in manners identical to those described for the coupling device of the first embodiment.

Figure 5:
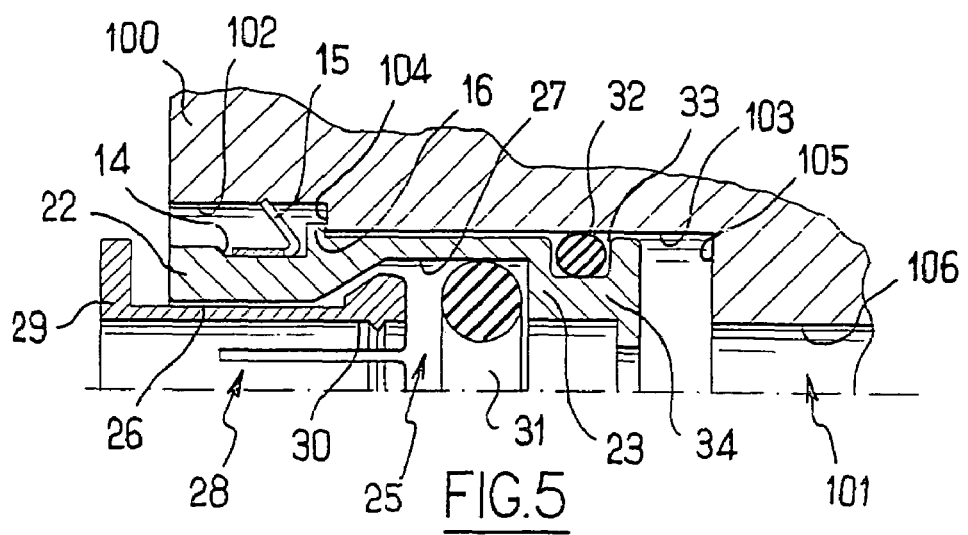

In a second variant, shown in FIG. 5, and based on the first variant, the sealing element 17 is replaced by a first sealing element 31 received in the outlet segment 27 of the bore 25 of the insert 21, and by a second sealing element 32 received in an outside groove 33 in a terminal portion 34 extending the end 23 of the insert 21.

The sealing element 31 is arranged to provide sealing for the connection between the pipe end and the insert 21, while the sealing element 32 is designed to provide sealing for the connection between the insert 21 and the body 100.

The coupling device is put into place, operates, and can be withdrawn in manners identical to those described for the coupling device of the first embodiment.

Figure 6:
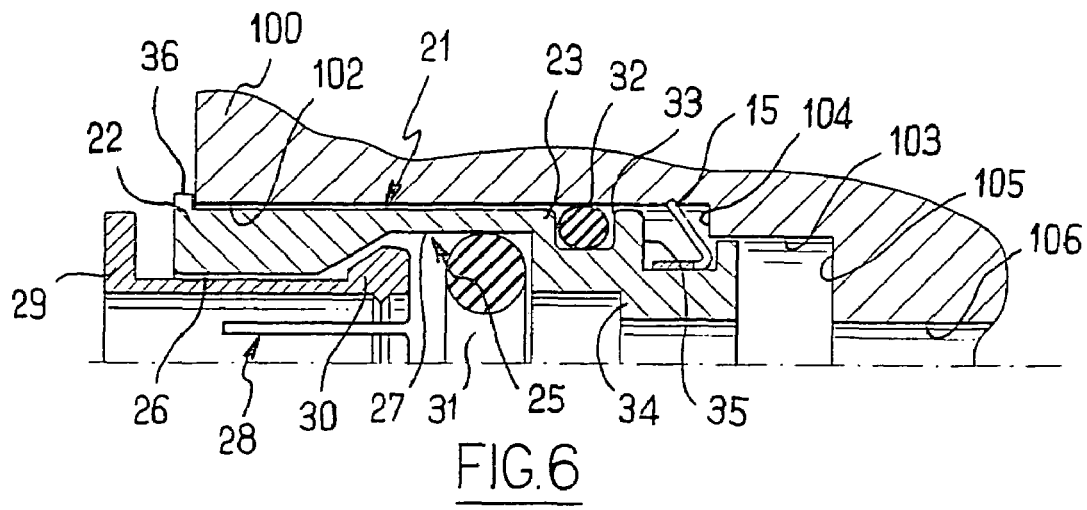

In a third variant shown in FIG. 6 and based on the second variant, the anchor washer 15 is received in a groove 35 of the terminal portion 34 downstream from the sealing element 32 in the direction of insertion into the bore 101, the inlet segment 102 of the bore 101 being longer than in the first embodiment and in the two variants described above.

The abutment 16 is replaced by an abutment 36 which bears against an outside surface of the body 100 surrounding the opening of the inlet segment 102 at the outside of the body 100.

The coupling device is put into place, operates, and can be withdrawn in manners identical to those described for the coupling device of the first embodiment.

It should be observed that in the second and third variants, the distance between the end 23 of the insert 21 in the anchor position (as shown in FIGS. 5 and 6) and the shoulder 105 must be sufficient to allow the insert 21 to be pushed in as far as the release position.

A circuit element coupling device constituting a second embodiment of the invention is described below with reference to FIGS. 7 to 9, this embodiment differing from the first embodiment only in the nature of the anchor washer used and in the absence of an abutment 16 on the outside of the insert. The numerical references used for the second embodiment are therefore identical to those used for the first embodiment, except with respect to the anchor washer which is referenced 40 and a ring which is referenced 41, as described in greater detail below.

The washer 40 differs from the anchor washer 15 in that it is deformable elastically rather than plastically between its anchor state and its free passage state.

Downstream from the anchor washer 40, a ring 4' is mounted to slide on the insert 1 between a rest position in which the ring 41 extends over the outside portion of the insert 1 adjacent to the groove 14, and an active position in which the ring 41 extends over the groove 14.

Figure 7:
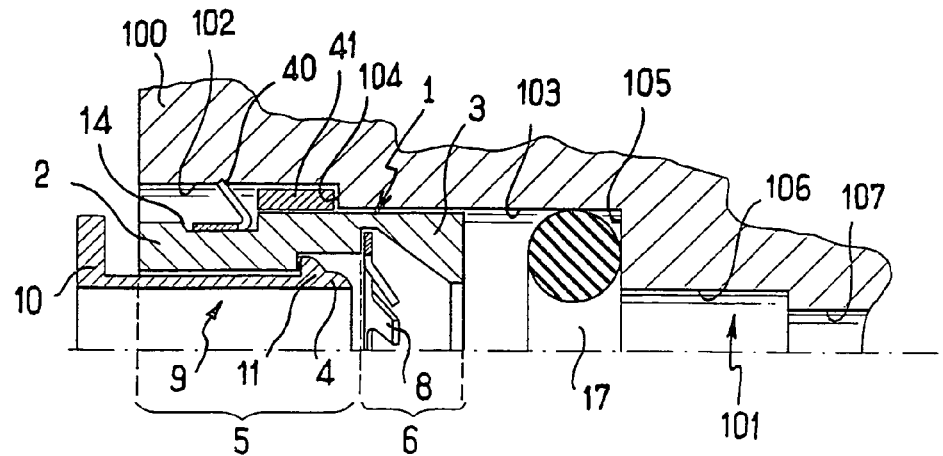
FIG. 7 is a longitudinal section view of a circuit element constituting a second embodiment of the invention.

The coupling device in the second embodiment is put into place in the same manner as in the first embodiment, with the insertion force being interrupted once the ring 41 in its first position comes into abutment against the shoulder 104 (FIG. 7). In this context, it should be observed that the ring 41 can be weakly bonded to the insert 1 with adhesive so as to establish a connection that will give way under a determined force. The ring may also be shouldered on the insert by an abutment of the same kind as the abutment 16 in the above-described figures and situated in register with the front flank of the groove 14. It is also possible to put a kind of breakable clip into position so as to create a shoulder that can be "retracted".

Figure 8:
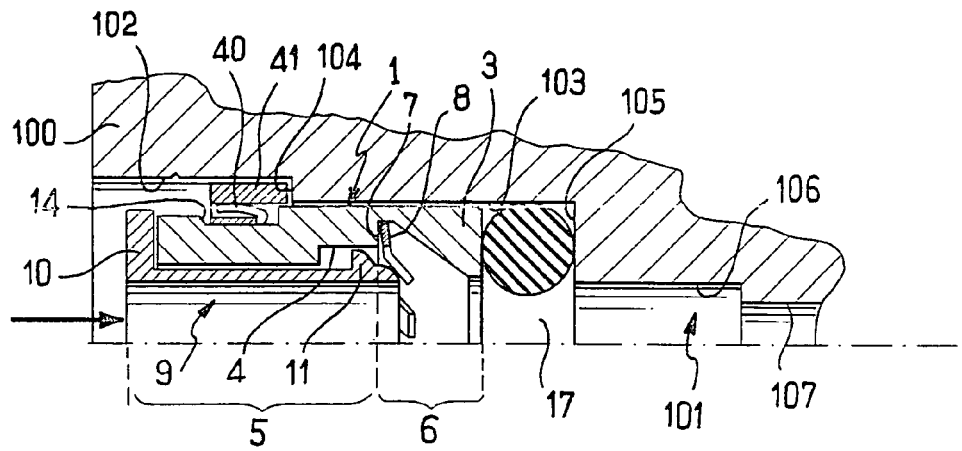
FIG. 8 is a view analogous to FIG. 7 during a stage of preparation for withdrawal of the coupling device.

The coupling device is withdrawn by pushing in the pusher 9 so as to move the insert 1 inside the bore 101 in the insertion direction until the ring 41, which is stationary relative to the bore 101, reaches its second position, thereby deforming the anchor washer 15 into its free passage state (FIG. 8).

Figure 9:
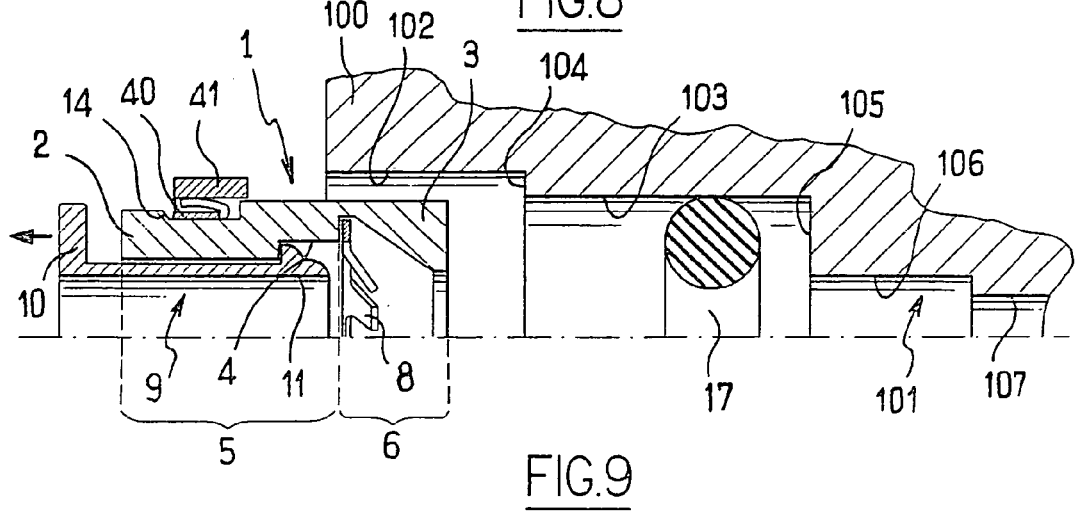
FIG. 9 is a view analogous to FIG. 7 during withdrawal of the coupling device.

It is then possible to withdraw the coupling device from the bore 101 (FIG. 9).

By returning the ring 41 to its previous position, the anchor washer can be returned to its anchor state, thereby enabling the coupling device to be reused.

Naturally, the invention is not limited to the embodiments described and variants can be applied thereto without going beyond the ambit of the invention as defined by the claims.

What is claimed is:

1. A fluid transport circuit element comprising a body having a bore with one end fitted with a pipe end coupling device, the coupling device having a portion fitted with an anchor washer for anchoring the device in the bore, wherein the washer has teeth that bite into a surface of the bore in an anchor state of said washer and is deformable between said anchor state and a free passage state, and wherein said portion is arranged to be drivable from outside the body in the insertion direction into the bore from an anchor position in which the washer is in its anchor state and a release position in which the washer co-operates in the insertion direction with a stationary abutment that is inside the bore, thereby bringing the washer into its free passage state, and retention means for retaining the washer in said free passage state.

2. An element according to claim 1, wherein the anchor washer is elastically deformable between its two states, the retention means comprising a ring mounted on an anchor washer support portion downstream from the anchor washer relative to the insertion direction so as to slide onto the fitting portion and so as to bear against a shoulder of the bore in such a manner that the ring comes to overlie the anchor washer when the support portion is in the release position.

3. A fluid transport circuit element comprising a body having a bore with one end fitted with a pipe end coupling device, the coupling device comprising an insert engaged in the bore and fitted with an anchor washer for anchoring the device in the bore, wherein the washer has teeth that bite into a surface of the bore in an anchor state of said washer and is deformable between said anchor state and a free passage state, and wherein the coupling device has a portion arranged to make the insert drivable from outside the body in the insertion direction into the bore from an anchor position in which the washer is in its anchor state and a release position in which the washer co-operates in the insertion direction with a stationary abutment that is inside the bore, thereby bringing the washer into its free passage state, and retention means for retaining the washer in said free passage state, wherein said insert receives a tubular disconnection pusher which projects from the body at least when said insert is in the anchor position, and wherein said insert includes an abutment against insertion of the pusher, the abutment being arranged in such a manner that the pusher constitutes means for pushing said insert into the bore.

4. A fluid transport circuit element comprising a body having a bore with one end fitted with a pipe end coupling device, the coupling device having a portion fitted with an anchor washer for anchoring the device in the bore, wherein the washer is deformable between an anchor state and a free passage state, and wherein said portion is arranged to be drivable from outside the body in the insertion direction into the bore from an anchor position in which the washer is in its anchor state and a release position in which the washer cooperates with an abutment that is stationary relative to the bore in the insertion direction, thereby bringing the washer into its free passage state, the anchor washer being plastically deformable between its two states and retaining its free passage state by virtue of its plastic deformability.

5. An element according to claim 4, wherein the coupling device comprises an insert engaged in the bore, the anchor washer being secured to the insert.

6. An element according to claim 4, wherein the stationary abutment is a shoulder of the bore.

7. A fluid transport circuit element comprising a body having a bore with one end fitted with a pipe end coupling device, the coupling device comprising an insert engaged in the bore and fitted with an anchor washer for anchoring the device in the bore, wherein the washer is deformable between an anchor state and a free passage state, and wherein the coupling device has a portion arranged to make the insert drivable from outside the body in the insertion direction into the bore from an anchor position in which the washer is in its anchor state and a release position in which the washer cooperates with an abutment that is stationary relative to the bore in the insertion direction, thereby bringing the washer into its free passage state, the anchor washer being plastically deformable between its two states, wherein said insert receives a tubular disconnection pusher which projects from the body at least when said insert is in the anchor position, and wherein said insert includes an abutment against insertion of the pusher, the abutment being arranged in such a manner that the pusher constitutes means for pushing said insert into the bore.

8. A fluid transport circuit element comprising a body having a bore with one end fitted with a pipe end coupling device, the coupling device having a portion fitted with an anchor washer for anchoring the device in the bore, wherein the washer is deformable between an anchor state and a free passage state, and wherein said portion is arranged to be drivable from outside the body in the insertion direction into the bore from an anchor position in which the washer is in its anchor state and a release position in which the washer cooperates with an abutment that is stationary relative to the bore in the insertion direction, thereby bringing the washer into its free passage state, the anchor washer being plastically deformable between its two states and retaining its free passage state by virtue of its plastic deformability, wherein the stationary abutment includes a shoulder extending in the bore of the body.

9. An element according to claim 8, wherein the coupling device comprises an insert engaged in the bore, the anchor washer being secured to the insert.

10. An element according to claim 8, wherein the stationary abutment is a shoulder of the bore.

* * * * *